Patented Nov. 16, 1926.

1,607,585

UNITED STATES PATENT OFFICE.

ARTHUR BIDDLE, OF TRENTON, NEW JERSEY, ASSIGNOR TO UNITED PRODUCTS CORPORATION OF AMERICA, A CORPORATION OF DELAWARE.

PROCESS OF TREATING CAOUTCHOUC LATEX.

No Drawing.    Application filed December 4, 1924. Serial No. 753,975.

The invention relates to a process of treating caoutchouc latex for the purpose of producing compositions of matter useful in the arts and involves treatment of the latex with casein and other materials as hereinafter set forth.

By the term "latex" as herein employed is meant any of the milky or laticiferous saps or juices obtained from plants, trees and the like, more particularly those yielding caoutchouc and may be either the crude, purified or usual commercial product with or without preservatives.

By the term "caoutchouc" as herein employed is meant rubber, gutta-percha, balata, rubber substitutes and similar substances having like properties, as well as compositions or mixtures thereof, obtained from certain latexes after exposure to the air or subject to oxidation or to heat or otherwise. Inasmuch as these various substances have essentially substantially identical physical and chemical properties and are regarded as equivalents, differing only in the proportions of resinous and proteinous matter contained therein, they may be spoken of generically by the term "caoutchouc".

The term "casein" is intended to be generic and to comprehend any and all caseinous, albuminous or proteinous matters in which casein or an equivalent element is an essential ingredient or any mixture or composition thereof as may be obtained from milk, buttermilk, legumens, lentils, as well as may be found combined and mixed with various substances such as alkalies, preservatives, mineral matter or other chemicals and the casein may be used in the form of milk, preferably skimmed, or by using it in its pure state in either liquid, semi-plastic or dry form and either soluble or insoluble, as may be most convenient for the purposes desired.

I have found that by treating latex in accordance with my process as hereinafter disclosed a composition may be produced which is suitable for use in the arts, as the same is capable of being worked, molded or otherwise employed either alone or when combined with suitable fillers so as to provide coatings, sealing compounds, molded articles and the like, as may be desired.

In the performance of my process ordinary commercial latex capable of yielding from 30% to 40% of solid rubber, balata or gutta-percha may be employed and in the examples hereinafter stated the utilization of such latex is contemplated. Additionally, the consistency and characteristics of the composition resulting from the performance of the process vary in some respects with the materials utilized in the treatment of the latex and I shall therefore, to enable those skilled in the art to practice the invention, refer to the treatment of the latex with casein and various ingredients such as relatively strong alkalies, particularly lime with sodium fluoride, weaker alkalies particularly ammonia and sodium silicate, and also when no alkalies are utilized, as when the casein is introduced in the form of milk.

For an example of one manner of performing the process with a view to producing a composition containing a minimum amount of water and of a relatively hard nature, I may combine with 100 parts of casein, an alkaline solvent comprising from 10 to 30 parts of lime and 2 to 15 parts of sodium fluoride and from 200 to 300 parts of water. These ingredients are mechanically mixed and allowed to dissolve and then added to, conveniently, 500 parts of latex, which results in the formation of a homogeneous creamy mass which may be then, if desired, precipitated by adding from 2 to 10 parts of an acid diluted in a small quantity of water, and for this purpose I may conveniently employ sulphuric acid although other acids may be utilized. The addition of the acid results in the coagulation of the mixture, the plastic mass taking a solid or granular form and being held in suspension or settling to the bottom, its form being dependent upon the coagulant or precipitant used and varying temperature conditions. When the mass is thrown down in solid form the mother liquid may be drawn off mechanically and when the precipitation is effected in granular form the mother liquid may be decanted off and the granular residue pressed dry or semi-dry. The resultant product of the example just given may now be worked or molded into the desired shape or otherwise employed.

As another example of the treatment of latex in accordance with my process when it is desired to produce a more flexible product and one of greater purity than in the example just given, I may add to 100 parts of casein from 10 to 20 parts of ammonia and from 300 to 400 parts of water. This mixture is allowed to dissolve and then added to form 300 to 500 parts of latex and the resultant composition may, if desired, be precipitated by the addition of from 4 to 15 parts of, preferably slightly diluted, acid, conveniently sulphuric acid although other acids may be employed. The addition of the acid effects precipitation from the composition of a plastic mass in a manner similar to that referred to in the foregoing example which mass, after the removal of the mother liquid in any desired way, may be worked, molded or otherwise utilized. It is to be noted that the strength and quantity of the acid used in the performance of the process is determined by the amount of alkali employed in dissolving the casein, as in any case it is necessary that the acid completely neutralize the alkali and preferably impart a slightly acid reaction in order to effect precipitation.

Under certain conditions instead of employing casein as such it may be more convenient to utilize milk in its natural state and preferably skimmed; under such conditions the dissolving of the casein by means of an alkali as in the foregoing examples may be omitted and the milk added directly to the latex, good results being obtained when approximately 500 parts of milk are added to an equal quantity of latex, after which precipitation of the solid content may be effected by the addition of an acid as in the foregoing examples but in a relatively less quantity owing to the lower alkalinity of the mixture.

It will be understood that the foregoing examples are merely typical and that the proportions of the various ingredients therein given may be varied materially from those stated if desired and with a view to varying the resultant product with respect to its flexibility, working properties, appearance, transparency and the like and the said examples and proportions recited are thus to be considered solely as typical and not by way of limitation as to the proportions and specific nature of the ingredients employed.

It will be furthermore understood that for certain purposes the composition resulting from the treatment of the latex with the casein after it has been dissolved by the use of a suitable casein solvent such as lime may be employed directly and the precipitation step entirely omitted, the said composition being adapted for coatings, adhesives, waterproofing compositions and the like; when, however, a composition of higher viscosity and greater body is desired the same may be obtained by the utilization of the precipitation step as in the foregoing examples.

Additionally it is to be understood that materials having similar chemical properties to those named may be utilized for dissolving the casein and also for effecting precipitation if desired; thus, for example, suitable acid salts such as acid sodium sulphate or the acid salts of copper sulphate may be utilized in place of the sulphuric or other acid mentioned, and moreover that suitable filling materials or vulcanizing agents may be added either to the resultant mass or to the mixture of casein and latex prior to the precipitation effected by the acid with a view to the production of a resultant product of given characteristics particularly required for its employment for a given purpose.

While I have herein disclosed with considerable particularity certain preferred manners of performing my invention, I do not thereby desire or intend to limit myself solely thereto for, as hitherto stated, the precise proportions of the materials utilized may be varied and other materials having equivalent chemical properties employed if desired without departing from the spirit and scope of the invention as defined in the appended claims.

Having thus described my invention, I claim and desire to protect by Letters Patent of the United States:

1. A process of combining caoutchouc latex and casein which comprises the addition to the latex of casein previously subjected to the action of a lime solution.

2. A process of combining caoutchouc latex and casein which comprises the addition to the latex of casein previously subjected to the action of a casein solvent and then effecting coagulation by the addition of an acid substance.

3. A process of treating caoutchouc latex which comprises the addition to the latex of dissolved casein and then effecting precipitation by the addition of a precipitating agent.

4. A process of combining caoutchouc latex and casein which comprises the addition to the latex of an alkaline solution of casein and then effecting precipitation by the addition of an excess of an acid substance.

5. The process of making a plastic composition comprising combining in solution caoutchouc latex and casein and then effecting their precipitation by a percipitating agent.

In witness whereof, I have hereunto set may hand this 2nd day of December, 1924.

ARTHUR BIDDLE.